United States Patent
Andreu (10) Patent No.: US 11,924,316 B2
(45) Date of Patent: Mar. 5, 2024

(54) SYSTEM AND METHODS FOR AUTOMATED COMPUTER SECURITY POLICY GENERATION AND ANOMALY DETECTION

(71) Applicant: OPSWAT Inc., Tampa, FL (US)

(72) Inventor: Andres De Jesus Andreu, Cary, NC (US)

(73) Assignee: OPSWAT Inc., Tampa, FL (US)

( * ) Notice: Subject to any disclaimer, the term of this patent is extended or adjusted under 35 U.S.C. 154(b) by 500 days.

(21) Appl. No.: 17/190,687

(22) Filed: Mar. 3, 2021

(65) Prior Publication Data

US 2021/0185072 A1 Jun. 17, 2021

Related U.S. Application Data

(63) Continuation of application No. PCT/US2019/053533, filed on Sep. 27, 2019.

(60) Provisional application No. 62/737,337, filed on Sep. 27, 2018.

(51) Int. Cl.
*H04L 69/40* (2022.01)
*G06F 18/214* (2023.01)
*H04L 9/40* (2022.01)

(52) U.S. Cl.
CPC ............ *H04L 69/40* (2013.01); *G06F 18/214* (2023.01); *H04L 63/0236* (2013.01); *H04L 63/1416* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,690,933 | B1* | 6/2017 | Singh | G06N 5/025 |
| 2011/0231510 | A1* | 9/2011 | Korsunsky | G06F 21/55 |
| | | | | 709/213 |
| 2014/0096251 | A1* | 4/2014 | Doctor | H04L 63/1441 |
| | | | | 726/23 |

(Continued)

OTHER PUBLICATIONS

International Search Report dated Jan. 3, 2020 for PCT Patent Application No. PCT/US2019/053533.

(Continued)

*Primary Examiner* — Kaveh Abrishamkar
(74) *Attorney, Agent, or Firm* — MLO, a professional corp.

(57) ABSTRACT

A method for automated computer security policy generation and anomaly detection includes receiving first network traffic data via an input port. The first network traffic data includes multiple data packets. A representation of each of the data packets is stored in a first data store, to produce a set of training data. A set of communication protocols associated with the set of training data is detected, and the training data from the set of training data is restructured based on the set of communication protocols, to produce processed data. The processed data is stored as non-malicious data in a second data store. The first network traffic data is transmitted, in unmodified form, via an output port. Second network traffic data including multiple data packets is subsequently received, via the input port, and compared to the non-malicious data to detect an anomaly in the second network traffic data.

21 Claims, 6 Drawing Sheets

(56) References Cited

U.S. PATENT DOCUMENTS

| | | | |
|---|---|---|---|
| 2016/0028763 A1* | 1/2016 | Cruz Mota | H04L 63/1458 |
| | | | 726/23 |
| 2016/0212171 A1* | 7/2016 | Senanayake | G06F 3/013 |
| 2017/0063886 A1* | 3/2017 | Muddu | G06F 16/444 |
| 2017/0126718 A1* | 5/2017 | Baradaran | H04L 63/0281 |
| 2018/0253550 A1* | 9/2018 | Kuperman | G06F 15/76 |
| 2019/0124118 A1* | 4/2019 | Swafford | G06F 21/84 |

OTHER PUBLICATIONS

European Search Report dated May 23, 2022 for European Patent Office Patent Application No. 19866447.6.
Office Action dated Jan. 4, 2023 for India Patent Application No. 202117010269.

* cited by examiner

SYSTEM AND METHODS FOR AUTOMATED COMPUTER SECURITY POLICY GENERATION AND ANOMALY DETECTION

CROSS-REFERENCE TO RELATED APPLICATION

This application is a bypass Continuation of International Patent Application No. PCT/US2019/053533, filed Sep. 27, 2019 and titled "SYSTEM AND METHODS FOR AUTOMATED COMPUTER SECURITY POLICY GENERATION AND ANOMALY DETECTION," which claims priority to and the benefit, under 35 U.S.C. 119(e), of U.S. Provisional Patent Application No. 62/737,337, filed on Sep. 27, 2018 and titled "SYSTEM AND METHODS FOR AUTOMATED COMPUTER SECURITY POLICY GENERATION AND ANOMALY DETECTION," the entire contents of each of which are herein incorporated by reference in their entireties.

FIELD

The present disclosure relates to the monitoring of live computer network data for enforceable security policy generation.

BACKGROUND

In computer science disciplines, network security refers to policies and practices used for monitoring and preventing unauthorized access to, and/or preventing disruptive traffic from reaching, computer network resources.

SUMMARY

In some embodiments, a method for automated computer security policy generation and anomaly detection includes receiving first network traffic data via an input port. The first network traffic data includes multiple data packets. A representation of each of the data packets is stored in a first data store, to produce a set of training data. A set of communication protocols associated with the set of training data is detected, and the training data from the set of training data is restructured based on the set of communication protocols, to produce processed data. The processed data is stored as non-malicious data in a second data store. The first network traffic data is transmitted, in unmodified form, via an output port. Second network traffic data including multiple data packets is subsequently received, via the input port, and compared to the non-malicious data to detect an anomaly in the second network traffic data.

In some embodiments, a method for automated computer security policy generation and anomaly detection includes receiving first network traffic data via an input port. The first network traffic data includes multiple data packets. A representation of each of the data packets is stored in a first data store, to produce a set of training data. A set of communication protocols associated with the set of training data is received or detected, and the training data from the set of training data is restructured based on the set of communication protocols, to produce processed data. A security policy is generated based on the processed data. The first network traffic data is transmitted, in unmodified form, via an output port. Second network traffic data including multiple data packets is subsequently received, via the input port, and analyzed based on the security policy to determine a maliciousness of the second network traffic data. A signal can then be transmitted, for example to trigger a remediation action based on the determined maliciousness of the second network traffic data

DETAILED DESCRIPTION

Systems and methods of the present disclosure facilitate adaptive, customizable computer network traffic analysis and network security management. In some embodiments, a system functions as a "transparent bridge," in that the system (e.g., via an interceptor) inspects data packets of incoming network traffic and passes those data packets to the intended back-end (destination) internal protocol (IP) address. Some examples of data elements (and/or their respective attributes) of the data packets of the incoming network traffic that can be recorded by systems of the present disclosure include, but are not limited to: Media Access Control (MAC) addresses, Industrial Control System (ICS) Protocol remote function codes and values, and relevant timestamps. The system can connect multiple disparate network segments with other bridges and/or network segments to allow for a bi-directional transparent flow of the data packets. For example, the system may route the data packets based on relevant network metadata (e.g., destination IP address) within the data packets, which for example may have a "Five-Tuple" (or 5-tuple) structure. Elements of a 5-tuple structure can include one or more of: a source IP address, a source port, a destination IP address, a destination port, and the layer 4 protocol. An example 5-tuple is as follows:

"192.168.1.10/40571/10.10.10.10/443/6,"

representing data coming from a source port 40571 of a source IP address 192.168.1.10, destined for destination port 443 of destination IP address 10.10.10.10, using IP protocol 6, which is Transmission Control Protocol (TCP).

Figure 1:
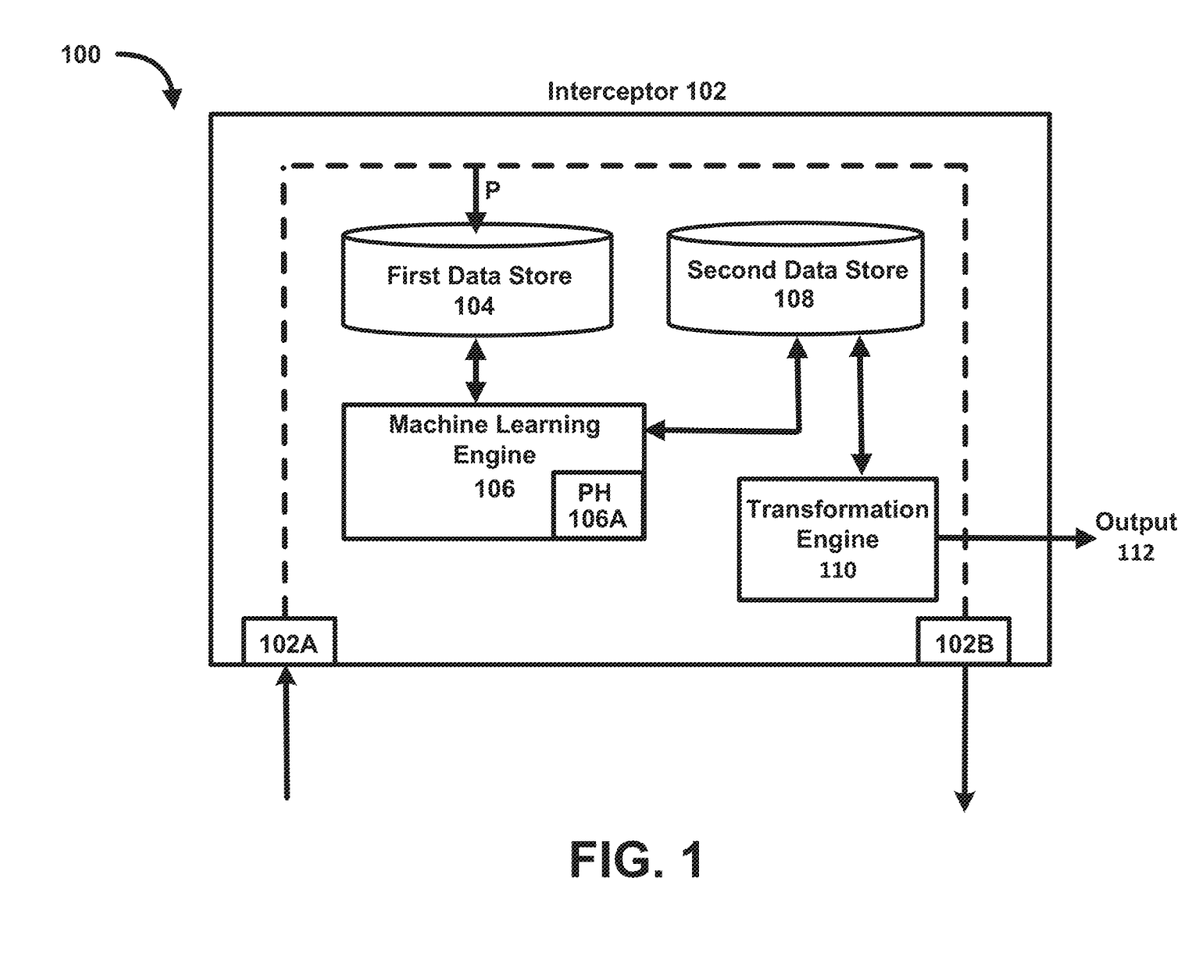
FIG. 1 shows a first view of an interceptor apparatus for automated computer security policy generation and anomaly detection, according to some embodiments.

FIG. 1 shows a system for automated computer security policy generation and anomaly detection, according to some embodiments. The system 100 of FIG. 1 includes an interceptor 102 having an input port 102A, an output port 102B, a first data store (e.g., a non-persistent data storage) 104, a machine learning engine 106, a second data store (e.g., a persistent data storage) 108, and a transformation engine 110. The interceptor 102 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The interceptor 102 can also include a memory operatively coupled to the processor through a system bus (for example, an address bus, a data bus and/or a control bus). The interceptor 102 can communicate with the one or more computing devices of the networked system via a wired and/or wireless network (not shown). The interceptor 102 may be physically located in a location that is geographically remote from the one or more computing devices with which the interceptor 102 communicates. In an implementation, the interceptor 102 is a cloud-based server that is accessible, for example, via an Internet connection. Alternatively, the interceptor 102 may also be physically co-located with the one or more computing devices with which the interceptor 102 communicates. The input and output ports 102A, 102B can be wired network interfaces and/or wireless network interfaces (e.g., wireless antennas and/or transceivers).

The machine learning engine 106 can include one or multiple protocol handlers 106A for native extraction of protocol-specific elements and/or attributes from raw network data (i.e., extraction of the "native data" of the incoming data packets) received at the interceptor 102. The machine learning engine 106 and protocol handlers 106A can be software stored in memory and executed by a processor (e.g., code to cause the processor to execute the machine learning engine 106 can be stored in the memory) and/or a hardware-based device such as, for example, an ASIC, an FPGA, a CPLD, a PLA, a PLC and/or the like. Software (executed on hardware) can be expressed in a variety of software languages (e.g., computer code), including C, C++, Java™, Ruby, Visual Basic™, and/or other object-oriented, procedural, or other programming language and development tools.

During operation, network traffic data (e.g., in the form of data packets) is received at input port 102A of the interceptor 102, is transmitted through the interceptor 102, and is sent back out of the interceptor 102 as output 112 (e.g., unmodified, for example in a format such as Pallaton, JavaScript Object Notation (JSON), eXtensible Markup Language (XML), etc.), via output port 102B. The interceptor 102 can "intercept" (i.e., capture or make a copy of, also referred to as "packet sniffing") data packets of the network traffic data using hardware and/or software, and "log" the intercepted packets, for example by storing them in the first data store 104. The first data store 104 can include one or more of: a message queue, a shared memory, a database, and a file system. The storage of intercepted data packets can be referred to as "sinking," "recording," "gathering," or "persisting" of the data packets. Intercepted network data stored in the first data store 104 can be referred to as "training data" or "raw data," and can represent a "learned body of data," for example if the intercepted data packets are captured during a "learning" period, as discussed further below.

In some embodiments, the interception of data packets is controlled by, or operates in collaboration with, a machine learning process implemented by the machine learning engine 106. In some embodiments, the machine learning process is initiated/triggered (and, at a later time, terminated) by an associated instruction received from a user (e.g., via a local user interface and/or via a signal encoding the instruction received at the interceptor 102). In other embodiments, the machine learning process is executed by the machine learning engine 106 according to a predetermined schedule (e.g., beginning at a predetermined time and ending at a predetermined time). When the machine learning engine 106 is executing the machine learning process, the machine learning engine can be said to be in "training mode" or "learning mode."

Once the machine learning engine 106 is no longer in training mode, the machine learning engine 106 (e.g., via the protocol handlers 106A) processes the training data from the first data store 104 and restructures the training data according to subjective (e.g., compute environment-specific) and/or domain-specific information (or "rules") associated with each protocol that it detects, identifies, or "understands." In other words, the machine learning engine 106 can: (1) detect, based on the raw data coupled with protocol handler based definitions, one or more protocols associated with the training data (e.g., detecting Distributed Network Protocol (DNP3) traffic by inspecting the Data Link Layer to determine whether the start bytes are 0x564 (i.e., a starting identifier of each DNP3 frame is 0x564), e.g., as defined in the associated DNP3 protocol handler); (2) identify a set of rules associated with and applicable to the one or more detected protocols (e.g., by querying a local data store of rules, not shown); (3) restructure the training data based on the set of rules; and (4) store the restructured training data 108 (also referred to herein as "processed data") in the second data store. Examples of protocols that may be detected by the machine learning engine 106, and examples of fields associated with the protocols, are provided in Table 1 below. In some implementations, one or more indications of the one or more protocols associated with the training data are received from a remote compute device, rather than detected based on locally stored representations of data associated with the one or more protocols. As shown by Table 1, protocol-specific content can vary significantly. The restructuring of the training data can include one or more of: compression of the training data or subsets thereof, reformatting of the training data or subsets thereof, or normalizing the training data or subsets thereof (e.g., modifying a size of the training data or subsets thereof to match a uniform value). Each of the compression, reformatting, and normalizing can be performed according to protocol-specific steps. For example, a first portion or subset of the training data, associated with a first protocol, may be compressed using a first compression technique, while a second portion or subset of the training data different from the first portion or subset of the training data may be compressed using a second compression technique different from the first compression technique.

TABLE 1

Example Protocols and Associated Fields

| MODBUS | FIX | DNP3 | EGD |
|---|---|---|---|
| unit-identifier | tag | frame.checksum | type |
| function code | tag.beginstring | frame.source | version |
| read-register | tag.orderqty | frame.destination | request-id |
| read-registers | tag.price | frame.function-code | producer-id |
| write-register | tag.sendercompid | application.function-code | exchange-id |

TABLE 1-continued

Example Protocols and Associated Fields

| | | | |
|---|---|---|---|
| write-register-signed | tag.symbol | application.object-group | timestamp |
| write-registers | tag.targetcompid | application.object-variation | status |
| write-registers-signed | | application.data-objects | config-signature |
| access.write-registers | | application.object-value | reserved |
| access.write-registers-signed | | application.union-value | data-length*> |
| read-coil | | | |
| read-coils | | | |
| write-coil | | | |
| write-coils | | | |
| read-coils | | | |
| read-discrete-inputs | | | |
| read-holding-registers | | | |
| read-holding-registers-signed | | | |
| read-input-registers | | | |
| read-input-registers-signed | | | |
| response.input-register-values | | | |
| response.input-register-values-signed | | | |
| response.exception | | | |
| message.metadata | | | |
| adu.length | | | |
| register-number | | | |
| coil-number | | | |

| ETHERNET/IP | MQTT | COAP | IEC104 |
|---|---|---|---|
| command | command | version | type-identification |
| length | connect.username | type | cause-transmission |
| bodylength | subscribe topiclength | token-length | originator-address |
| cip.metadata | subscribe.topic | code | address-fields |
| cip.service | publish.topiclength | message-id | object-value |
| cip.service.object | publish.topic | option-number | |
| cip.service.class | publish.payloadlength | payload | |
| cip.service.instance | publish.payload | | |
| cip.service.attribute | | | |
| cip.service.value | | | |
| cip.service.value.elementary | | | |
| cip.service.value.symbolic | | | |
| cip.service.ansi-extended-symbol-segment | | | |
| response.cip.service.status | | | |

| OPC UA CONTROLS | FOX | FINS | SLMP |
|---|---|---|---|
| message-type | session.accountname | message.metadata | command |
| message-size | message.metadata | command-code | command-name |
| security-policy-uri | message.content | response-code | destination-network |
| error | message.header | sid | destination-station |
| error.reason | message.command | gateway-count | destination-module |
| type-id.identifier | message.channel | destination-network-address | destination-drop |
| browse-request.view-id.identifier | message.key.boolean | destination-network-address | response.end-code |
| browse-request.browse-description.node-id.identifier | message.key.integer | destination-node-number | device.write.device-codes |
| call-method-request.object-id.identifier | message.key.float | destination-unit-address | device.read.device-codes |
| call-method-request.method-id.identifier | message.key.string | destination.cpu-bus-unit | device.write.devices |
| call-method-request.input-arguments | message.key.time | source-network-address | device.read.devices |
| | message.key.blob | source-node-number | device.write.value |
| | message.submessage | source-unit-address | |
| | message.point.name | source.cpu-bus-unit | |
| | message.point.override | memory-area-read | |
| | message.point.emergencyoverride | memory-area-write | |
| | message.point.set | | |
| | message.point.action | | |
| | message.point.value | | |
| | message.point.override-duration | | |

An example of a rule associated with a protocol is as follows: for the communications protocol Modbus/TCP, a maximum message size can be 255 bytes, as defined by the communications specification.

In some embodiments, the protocol handlers 106A are "native" to machine learning engine 106, in that they are stored in a memory of the machine learning engine 106 at run time.

In some embodiments, each protocol handler 106A of the one or multiple protocol handlers 106A is configured to identify and/or process data of a single protocol type. As such, the training data may be subdivided according to protocol type (e.g., by one or more protocol handlers 106A) before being converted into restructured data by the machine learning engine 106. The restructured data produced by the machine learning engine 106 can then be compressed and stored together as a distinct subgroup of multiple subgroups of the restructured data. In some implementations, the protocol handlers 106A are only used during the training phase. Methods of compression of the restructured data can vary according to the protocol type of the underlying training data, and can vary based on the complexity of such underlying training data. In some implementations, the compressed, distinct subgroups of the restructured data represent, or are used by the system to automatically generate, rules (or a security policy) that are representative of the original, larger set ("superset") of training data from which they are derived.

In some embodiments, the transformation engine 110 is a standalone executable software residing within (operating on the processor of) the interceptor 102. The transformation engine 110 can be invoked, for example, in response to an end-user action. The transformation engine 110 can read restructured data from the second data store 108 (also referred to herein as a "restructured data store"), and output the read data in one or more formats (e.g., XML, JSON, etc.) different from a native format of the data store 108.

Once the restructured data has been stored, the interceptor 102 can perform one or more of the following actions: (1) create an enforceable security policy based on the restructured data, (2) perform anomaly detection based on the restructured data (e.g., via the transformation engine 110), and (3) modify the restructured data. As used herein, an "anomaly" refers to network traffic having one or more attributes that deviate from an expected value or range of values that have been learned and stored in the second/restructured data store 108. Any of creating the enforceable security policy, performing anomaly detection, and modifying the restructured data can occur automatically and/or in response to an input from a user received at the interceptor 102 (e.g., via a user interface and/or received from a remote computing device in operable communication therewith).

In some embodiments, the use of the interceptor 102 as a transparent bridge begins when a user logs into a management console (via a graphical user interface (GUI) thereof) in operable communication with the interceptor 102. The user can "set up" the transparent bridge, for example, by specifying an indicator of an input port (e.g., input port 102A) and an output port (e.g., output port 102B) for machine learning and/or monitoring of packet-based network traffic data. Once the transparent bridge is set up, run time daemons can read in, and act on, network data (e.g., data packets with 5-tuple data). Alternatively or in addition, the user can also input an instruction, via the GUI, to commence a machine learning process (i.e., the user selects "training mode"). During the machine learning process (and, optionally, beginning prior to the machine learning process), network data (including data packets, for example having 5-tupe sets of data) flows through the "bridge" (i.e., the interceptor 102, via the specified input and output ports), and the data packets are stored in the first data store 104.

An example of learned/raw collected data (e.g., data stored in first data store 104 after the collection of live network traffic data) appears as follows:
00 00 03 04 00 06 00 00 00 00 00 00 00 08 00 45 00 00
40 4b 64 40 00 40 06 a4 92 c0 a8 64 b8 c0 a8 64 b8 b8 ef
01 f6 dd 2b 52 39 a2 e2 5f 19 80 18 01 56 4a f4 00 00 01
01 08 0a 06 8b 19 5a 06 8b 19 5a 00 01 00 00 00 06 00 06
00 00 00 08 00 00 00 03 04 00 06 00 00 00 00 00 00 00 08
00 45 00 00 40 4b 66 40 00 40 06 a4 90 c0 a8 64 b8 c0 a8
64 b8 b8 ef 01 f6 dd 2b 52 45 a2 e2 5f 25 80 18 01 56 4a
f4 00 00 01 01 08 0a 06 8b 1a 55 06 8b 19 5b 00 02 00 00
00 06 00 06 00 00 00 04 00 00 03 04 00 06 00 00 00 00 00
00 64 00 08 00 45 00 00 40 4b 6a 40 00 40 06 a4 8c c0 a8
64 b8 c0 a8 64 b8 b8 ef 01 f6 dd 2b 52 5d a2 e2 5f 3d 80
18 01 56 4a f4 00 00 01 01 08 0a 06 8b 1c 4a 06 8b 1b 50
00 04 00 00 00 06 00 06 00 00 00 05 00 00 03 04 00 06 00
00 00 00 00 00 00 08 06 08 00 45 00 00 40 4b 72 40 00 40 06
a4 84 c0 a8 64 b8 c0 a8 64 b8 b8 ef 01 f6 dd 2b 52 8d a2
e2 5f 6d 80 18 01 56 4a f4 00 00 01 01 08 0a 06 8b 20 35
06 8b 1f 3b 00 08 00 00 00 06 00 06 00 00 00 09 00 00 03
04 00 06 00 00 00 00 00 00 04 06 08 00 45 00 00 40 4b 76
40 00 40 06 a4 80 c0 a8 64 b8 c0 a8 64 b8 b8 ef 01 f6 dd
2b 52 a5 a2 e2 5f 85 80 18 01 56 4a f4 00 00 01 01 08 0a
06 8b 22 2b 06 8b 21 30 00 0a 00 00 00 06 00 06 00 00 00
06 00 00 03 04 00 06 00 00 00 00 00 00 da 26 08 00 45 00
00 40 4b 78 40 00 40 06 a4 7e c0 a8 64 b8 c0 a8 64 b8 b8
ef 01 f6 dd 2b 52 b1 a2 e2 5f 91 80 18 01 56 4a f4 00 00
01 01 08 0a 06 8b 23 25 06 8b 22 2b 00 0b 00 00 00 06 00
06 00 00 00 0a 00 00 03 04 00 06 00 00 00 00 00 00 d1 d2
08 00 45 00 00 40 4b 86 40 00 40 06 a4 70 c0 a8 64 b8 c0
a8 64 b8 b8 ef 01 f6 dd 2b 53 05 a2 e2 5f e5 80 18 01 56
4a f4 00 00 01 01 08 0a 06 8b 2a 00 06 8b 29 05 00 12 00
00 00 06 00 06 00 00 00 07

The machine learning engine 106 can monitor and collect copies of data packets of the network traffic data as it is transmitted through the interceptor 102. In some implementations, the machine learning process is performed at/during a time when it is expected that the network traffic is trustworthy (i.e., when the network traffic is determined to be "known good data," or known non-malicious data). "Known good data" refers to data packets constituting a low security risk and/or data packets that can be whitelisted (e.g., permitted to pass through the interceptor 102 without being blocked). In other words, known good data is data that is transmitted or that flows through a network under "normal" operations (e.g., when no security risk is present). To apply "whitelisting" to data packets, representations of such rules (e.g., indications that the data packets are whitelisted) can be persistently stored directly in the second data store 108 and associated with representations of the whitelisted data packets or groupings thereof.

When the training mode ends (e.g., once a predetermined duration of the machine learning process (also referred to as a training/data collection process) has elapsed, or when the user inputs an instruction to end the machine learning process), the machine learning engine 106 queries the first data store 104 to obtain all "learned" data (i.e., the training data—all records associated with data packets that have been collected during the machine learning process). The machine learning engine 106 analyzes ("inspects") the training data, for example by applying one or more algorithms to the training data, to identify one or more protocols (e.g., Ethernet/IP, DNP3, MODBUS/TCP, etc.) associated with the training data. The machine learning engine 106 then invokes one or more protocol handlers 106A based on the learned/recorded data (e.g., by matching a protocol handler 106A with a portion of the learned/recorded data having a protocol associated with that protocol handler 106A). The one or more protocol handlers 106A then collate, compress and reorganize the training data into a restructured form (i.e., restructured data).

The restructured data is stored in the second data store 108, and represents data that has been identified by the system 100 as being permissible (e.g., non-malicious), since the restructured data is derived from the raw data that was collected during the window of "known good data" collection (i.e., the machine learning process). The restructured form can be one or more of compressed, merged, concatenated, subdivided into ranges, normalized to a common format for ease of reference/retrieval/comparison, or otherwise "processed." The restructured data can include: (1) indicators for each entity involved in the transmission of the original data packet, e.g., with associated indications as to whether the entity functioned as a host or as a client; (2) indicators of source entity (e.g., IP address) and/or destination entity (e.g., IP address) for each data packet; (3) an indicators of a function type (e.g., read or write) associated with each data packet, e.g., with associated data ranges; and/or (4) date and time information.

The restructured data that is sent from the machine learning engine 106 to the second data store 108 can vary in its format, for example depending on the type of data store that is used in a given implementation. An example set of restructured data having a flat JSON format is as follows:

```
[
    {
        "obj_type": "client",
        "is_cluster": false,
        "parent": null,
        "cluster": null,
        "ip": "192.168.100.184",
        "source": "network",
        "state": "baseline",
        "notify": null,
        "proto": "modbus",
        "event_type": "ics_write",
        "function_code": 6,
        "event_sub_type": "range",
        "range_values": [{"range_low": 4, "range_high": 10}],
        "label": "ICS Write",
        "dst_port": 502,
        "_id": "5a1138d2bf10c7657b8146ca"
    },
    ....
]
```

Continuing the example, the transformation engine 110 can read the restructured data from the second data store 108 and restructure it into enforceable policy data as follows (the below showing an example subset of the possible data elements that may be included, and representing a snippet/example generated policy):

```
....
<p:condition control="ip4.source-address" op="="
value="192.168.100.184">
    <p:rule control="modbus.write-register" op="<=" value="3"
    verb="deny"></p:rule>
    <p:rule control="modbus.write-register" op=">=" value="11"
    verb="deny"></p:rule>
</p:condition>
```

Figure 2:
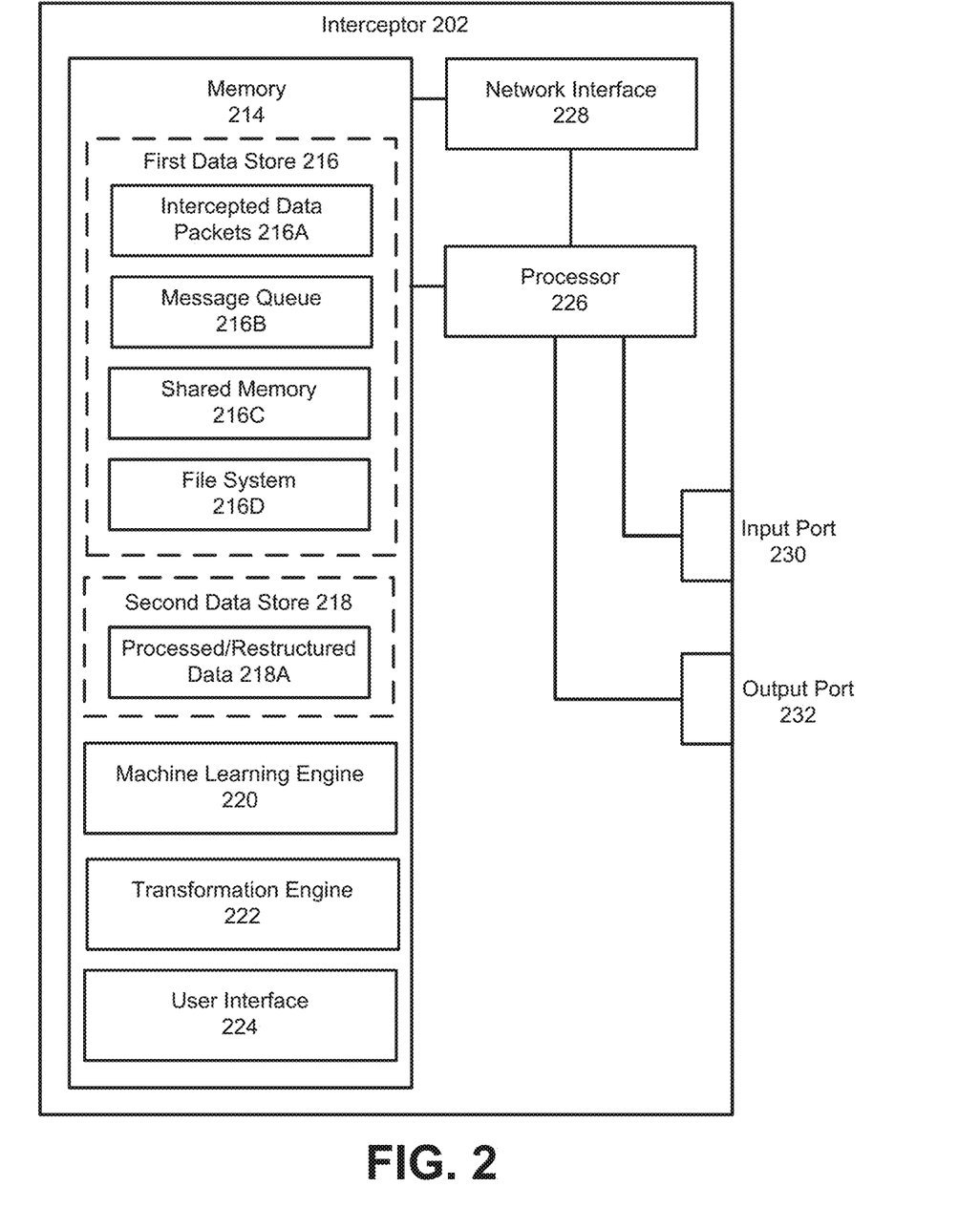
FIG. 2 shows a second view of an interceptor apparatus for automated computer security policy generation and anomaly detection, according to some embodiments.

FIG. 2 shows a second view of an interceptor apparatus for automated computer security policy generation and anomaly detection, according to some embodiments. As shown in FIG. 2, the interceptor 202 includes a memory 214, a network interface 228, a processor 226, an input port 230 and an output port 232. The processor 226 is operably coupled to the memory 214, the network interface 228, the input port 230 and the output port 232. The memory 214 optionally includes a first data store 216 and a second data store 218 (in other embodiments, the interceptor 202 can include a single/combined data store or database). The memory 214 also include a machine learning engine 220, a transformation engine 222, and a user interface 224 (e.g., software to implement a graphical user interface (GUI)). The first data store 216 includes intercepted data packets 216A, a message queue 216B, shared memory 216C, and a file system 216D. The shared memory 216C can include, for example, data associated with communications protocols and associated fields (such as those set forth in Table 1 above). The plurality of communication protocols can include at least one of: a process automation protocol (e.g., Modbus, Ethernet Global Data (EGD), Ethernet, Internet Protocol (IP), Factory Interface Network Service (FINS), an industrial control system protocol (e.g., OPC Unified Architecture (UA) controls), a power-system automation protocol (e.g., Distributed Network Protocol (DNP3), IEC 60870-5-104 (IEC104), etc.), a messaging protocol (e.g., Message Queuing Telemetry Transport (MQTT), Real Time Streaming Protocol (RTSP), Seamless Message Protocol (SLMP), etc.), an Internet Application protocol (e.g., Constrained Application protocol (COAP)), or an information exchange/peer-to-peer protocol (e.g., Financial Information eXchange (FIX), Niagara Fox protocol, etc.). The intercepted data packets 216A can include data packets from network traffic received via the input port 230 and/or via the network interface 228 (e.g., a wireless network communications interface, such as a wireless antenna). The second data store 218 includes processed/structured (or "restructured") data 218A. The processed/restructured data 218A can be generated by the processor 226 based on the intercepted data packets 216A.

FIG. 2 shows a second view of an interceptor apparatus for automated computer security policy generation and anomaly detection, according to some embodiments. As shown in FIG. 2, the interceptor 202 includes a memory 214, a network interface 228, a processor 226, an input port 230 and an output port 232. The processor 226 is operably coupled to the memory 214, the network interface 228, the input port 230 and the output port 232. The memory 214 optionally includes a first data store 216 and a second data store 218 (in other embodiments, the interceptor 202 can include a single/combined data store or database). The memory 214 also include a machine learning engine 220, a transformation engine 222, and a user interface 224 (e.g., software to implement a graphical user interface (GUI)). The first data store 216 includes intercepted data packets 216A, a message queue 216B, shared memory 216C, and a file system 216D. The shared memory 216C can include, for example, data associated with communications protocols and associated fields (such as those set forth in Table 1 above). The plurality of communication protocols can include at least one of: a process automation protocol (e.g., Modbus, Ethernet Global Data (EGD), Ethernet/IP, Factory Interface Network Service (FINS), an industrial control system protocol (e.g., OPC Unified Architecture (UA) controls), a power-system automation protocol (e.g., Distributed Network Protocol (DNP3), IEC 60870-5-104 (IEC104), etc.), a messaging protocol (e.g., Message Queuing Telemetry Transport (MQTT), Real Time Streaming Protocol (RTSP), Seamless Message Protocol (SLMP), etc.), an Internet Application protocol (e.g., Constrained Application protocol (COAP)), or an information exchange/peer-to-peer protocol (e.g., Financial Information eXchange (FIX), Niagara Fox protocol, etc.). The intercepted data packets 216A can include data packets from network traffic received via the input port 230 and/or via the network interface 228 (e.g., a wireless network communications interface, such as a wireless antenna). The second data store 218 includes processed/structured (or "restructured") data 218A. The processed/restructured data 218A can be generated by the processor 226 based on the intercepted data packets 216A.

Figure 3:
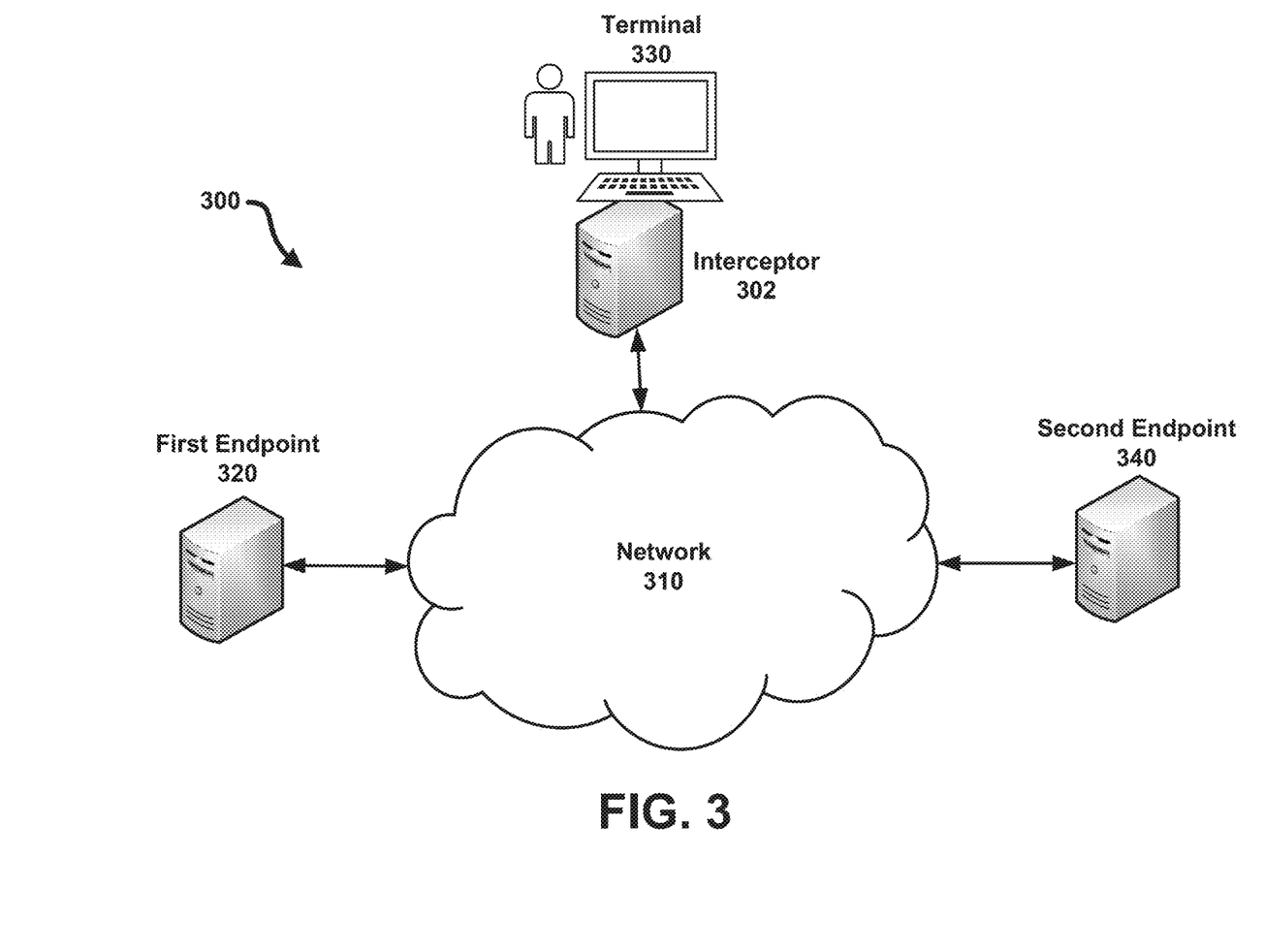
FIG. 3 shows a system for automated computer security policy generation and anomaly detection, according to some embodiments.

During operation of the system 300, network data packets are transmitted, via network 310, from the first endpoint 320 (as source device) and the second endpoint 340 (as destination device), or vice-versa. The interceptor 302 receives the network data packets, sent by the source device and passing through the network 310, prior to the network data packets arriving at the destination device, and generates/stores a copy of each of the network data packets before forwarding them, unmodified, to the destination device. The interceptor 302 can then identify multiple different communications protocols, each associated with a subset of the network data packets, based on the copies of the network data packets. The interceptor 302 can store associations between the copies of the network data packets and the identified communications protocols. Each subgroup of network data packets and its association with an identified communications protocol can optionally be stored in a separate portion of memory than each other subgroup of network data packets and their associations with an identified communications protocol. The interceptor 302 can also restructure the copies of the network data packets based on the identified communications protocols, to generate structured (or "restructured") data. The structured data can be stored and deemed/designed as "known good data" (i.e., whitelisted), for use in analyzing future network communications traffic. Alternatively or in addition, the structured data can be used by the interceptor 302 for generating network security policy rules (e.g., using one or more machine learning algorithms). The generated network security policy rules can, in turn, be applied to future network communications traffic. For example, future network communications traffic can be analyzed and a condition or anomaly associated with the future network communications traffic can be detected. In response to detecting the condition or anomaly in the future network communications traffic, one or more remediation options may be automatically triggered and/or presented to a user (e.g., via a GUI) for selection prior to implementation, and/or a signal to cause a remediation action can be transmitted. The remediation options can include, for example, blocking the transmission of one or more network data packets, sending a signal representing an alert to one or both of a source compute device and a destination compute device, etc. (not shown). The copying and restructuring of network data packets can occur during a training phase or period, and the comparison of network data packets to known good data and/or the application of network security policy rules can occur after the training phase, during an enforcement phase.

Figure 4:
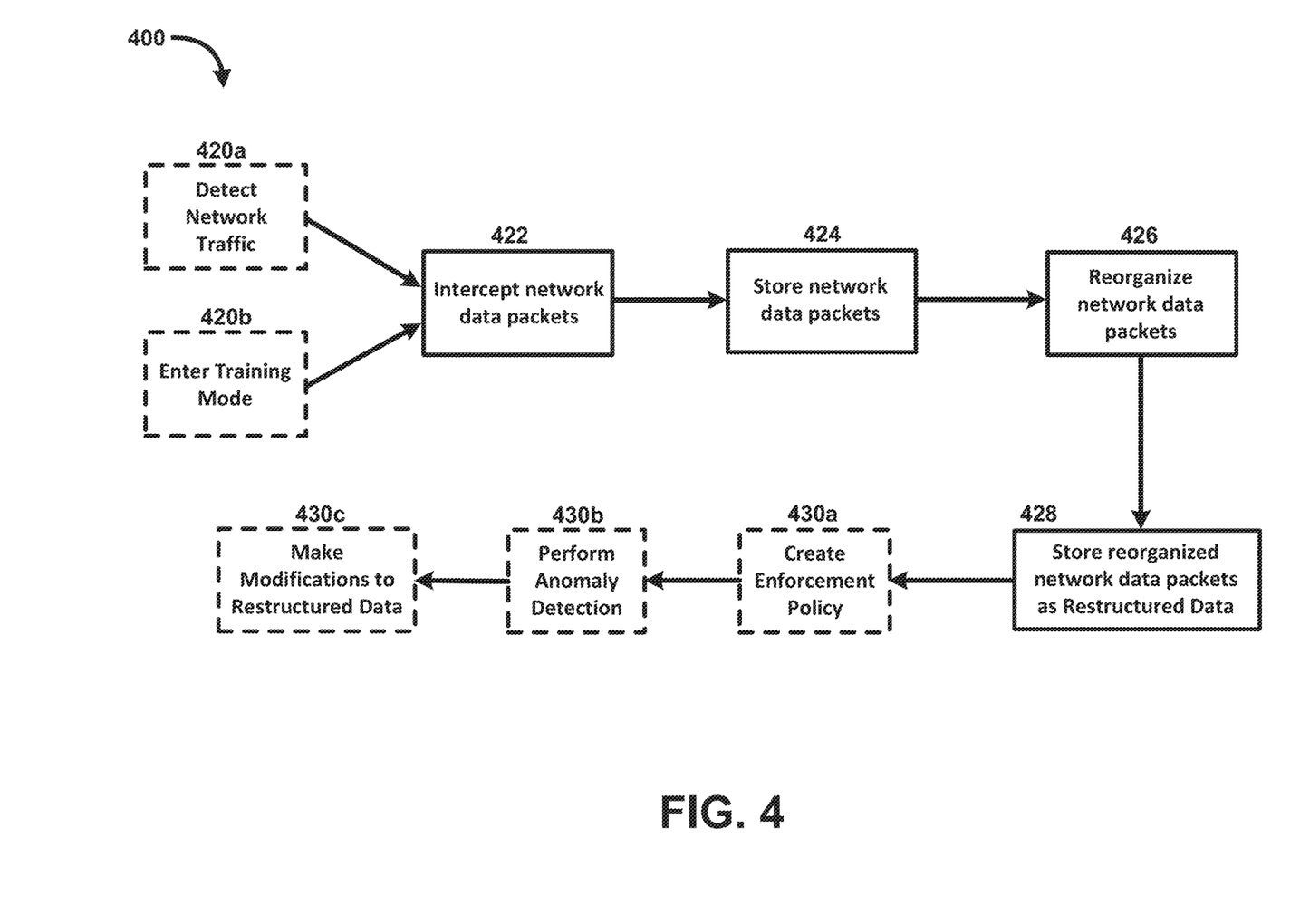
FIG. 4 is a flow diagram illustrating a method of automated computer security policy generation and anomaly detection, according to some embodiments.

FIG. 4 is a flow diagram illustrating a method of automated computer security policy generation and anomaly detection, implementable using the interceptor 102 of FIG. 1, according to some embodiments. As shown in FIG. 4, the method 400 commences either automatically (e.g., upon the detection, at 420a, of network traffic at an input port of an interceptor) or when the interceptor enters training mode (420b), for example in response to a user input at a GUI in communication with the interceptor or in response to detection that a current time matches a start time of a predetermined/scheduled training period. The interceptor intercepts network data packets at 422, and the intercepted network data packets are stored as training data (e.g., in associated records of a data store, such as first data store 104 in FIG. 1, at 424). The interceptor, e.g., using a machine learning engine and protocol handler(s) thereof (e.g., machine learning engine 106 and protocol handler(s) 106A of FIG. 1), retrieves the network data packets from storage and reorganizes (using one or more methods, e.g., including one or more machine learning algorithms) and compresses the retrieved network data packets (426) to form restructured data which is then stored, at 428 (e.g., in the same data store as, or a different data store from, the data store in which the training data was stored at 424). Once the reorganized network data packets have been stored as restructured data, the interceptor can perform one or more of the following actions: (1) create an enforceable policy based on the restructured data (e.g., via the transformation engine 110 of FIG. 1), (2) perform anomaly detection based on the restructured data, and/or (3) modify the restructured data, as discussed below. Performing the one or more actions can occur in response to a user input (e.g., via a GUI) and/or automatically. As noted above, in response to detecting the anomaly, one or more remediation options may be automatically triggered and/or presented to a user (e.g., via a GUI) for selection prior to implementation. The remediation options can include, for example, blocking the transmission of one or more network data packets, sending a signal representing an alert to one or both of a source compute device and a destination compute device, updating a security policy at one or both of the source compute device and the destination compute device, etc. (not shown).

Creation of an Enforcement Policy

The interceptor (e.g., via the transformation engine 110 of FIG. 1) can query the data store storing the restructured data, so as to retrieve the restructured data, and subsequently generate one or more security policies. The generated security policy can have any suitable format (e.g., an .xml file) and can be stored in a data store of the interceptor (and/or in a data store in operable communication therewith). The generated security policy can be referred to as a "persistent policy."

Anomaly Detection

The interceptor (e.g., via a processor thereof, executing instructions of an anomaly detection software application/daemon stored in a memory thereof) can query the data store storing the restructured data, to retrieve the restructured data. Subsequently, as network traffic data flows through the interceptor (i.e., not during a machine learning process), the interceptor/daemon reads live incoming data packets (e.g., received via the input port 102A of interceptor 102 in FIG. 1) into local memory and compares the incoming data packets with the restructured data (and/or the persistent policy) to determine whether an anomaly (i.e., a deviation from "known good data baseline" as represented by the restructured data) is present in the incoming data packets. If an anomaly is detected, one or more data packets associated with the anomaly may be "blocked," or may not be passed on (e.g., the interceptor may block the data packets such that they are not transmitted to the output port of the interceptor (e.g., output port 102B of interceptor 102 in FIG. 1)) for delivery to an intended recipient thereof.

Modification of Restructured Data

In some instances, the restructured data may include data that was collected in error (e.g., is errant, anomalous, or known bad data, e.g., having a known source/reason, that was captured during the machine learning process) and/or may exclude some known good data. A user can review the restructured data (e.g., via a GUI) and edit the restructured data by removing unwanted data and/or by adding known good data to the restructured data. Alternatively or in addition, the restructured data can be accessed and modified by the interceptor (e.g., via the machine learning engine), for example in response to the detection of new "known good data" packets being transmitted through the interceptor (e.g., during a second learning/training process) and/or based on an updated machine learning model being implemented at the machine learning engine of the interceptor.

Figure 5:
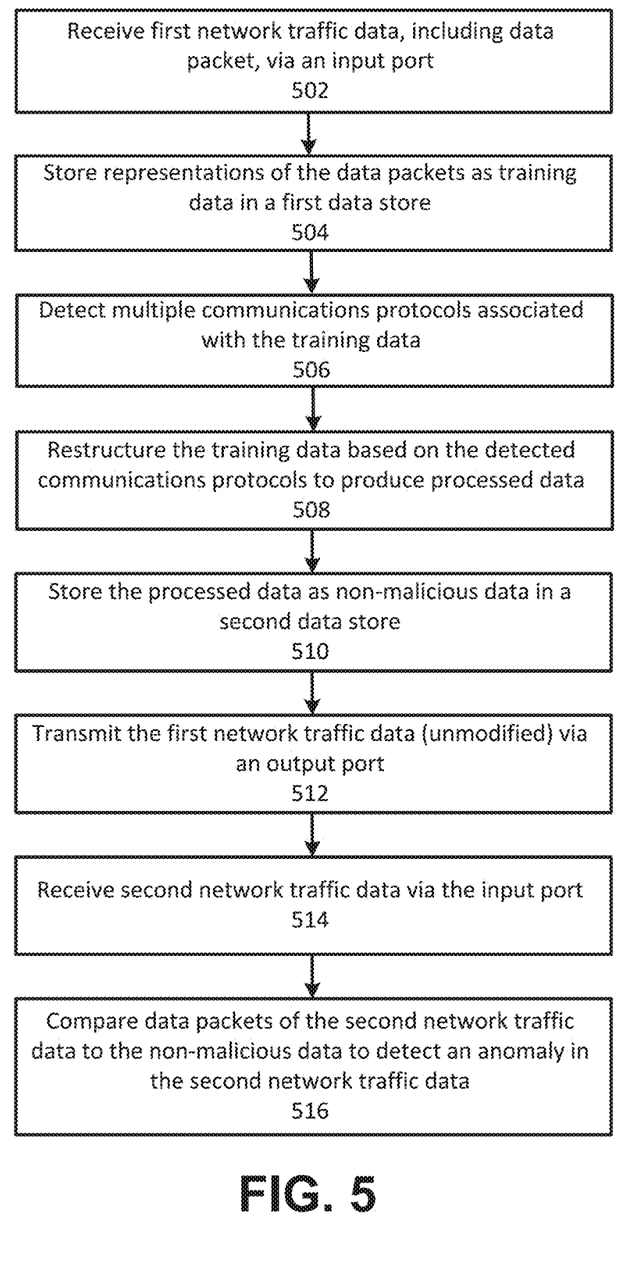
FIG. 5 shows a first method for automated computer security policy generation and anomaly detection, according to some embodiments.

FIG. 5 shows a first method for automated computer security policy generation and anomaly detection, according to some embodiments. As shown in FIG. 5, the method includes receiving, at 502, first network traffic data via an input port. The first network traffic data includes multiple data packets, and optionally includes known good data and/or is collected during a time period deemed to be associated with the transmission of known good data. A representation of each of the data packets is stored in a first data store, at 504, to produce a set of training data. At 506, a set of communication protocols associated with the set of training data is detected, and the training data from the set of training data is restructured at 508 based on the set of communication protocols, to produce processed data. At 510, the processed data is stored as non-malicious data in a second data store, optionally in compressed form. The first network traffic data is transmitted, at 512, in unmodified form, via an output port. Second network traffic data including multiple data packets is subsequently received, at 514, via the input port, and compared, at 516, to the non-malicious data to detect an anomaly in the second network traffic data. In response to detecting the anomaly in the second network traffic data, one or more remediation options may be automatically triggered and/or presented to a user (e.g., via a GUI) for selection prior to implementation, and/or a signal to cause a remediation action can be generated and transmitted. The remediation options can include, for example, blocking the transmission of one or more network data packets, sending a signal representing an alert to one or both of a source compute device and a destination compute device, etc. (not shown).

Figure 6:
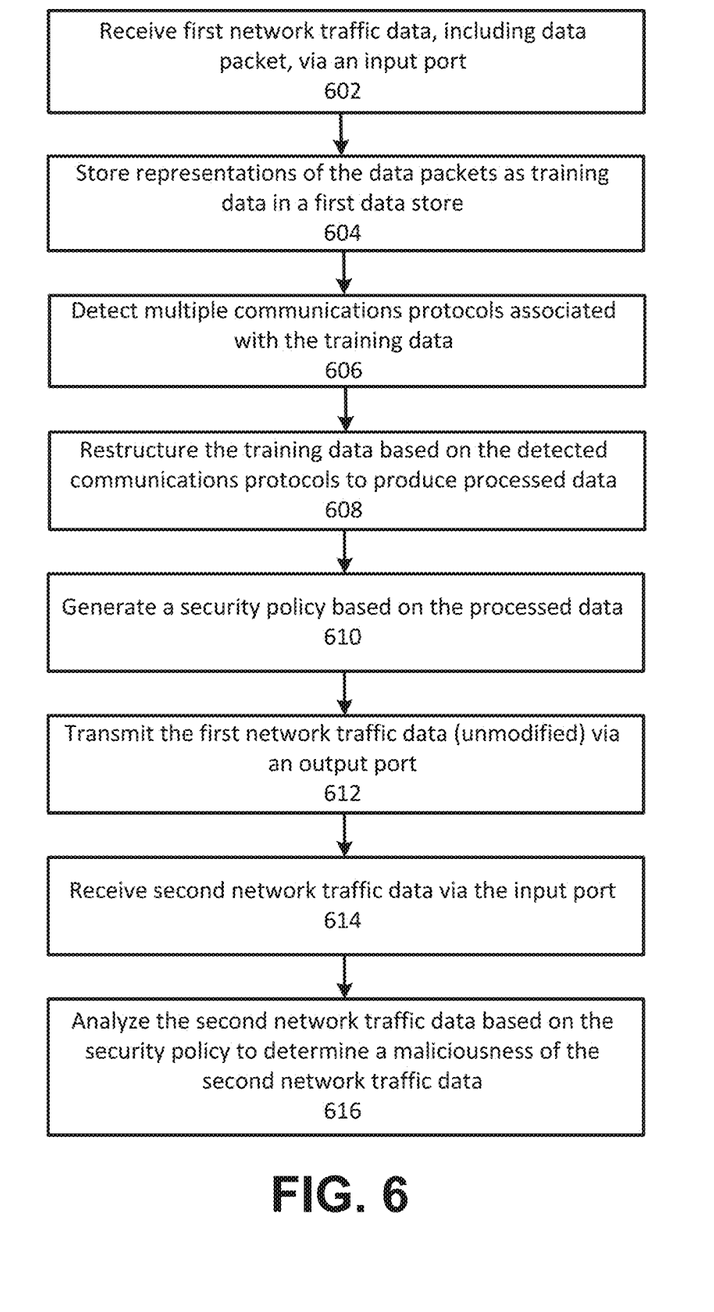
FIG. 6 shows a second method for automated computer security policy generation and anomaly detection, according to some embodiments.

FIG. 6 shows a second method for automated computer security policy generation and anomaly detection, according to some embodiments. As shown in FIG. 6, the method includes receiving first network traffic data via an input port, at 602. The first network traffic data includes multiple data packets, and optionally includes known good data and/or is collected during a time period deemed to be associated with the transmission of known good data. A representation of each of the data packets is stored, at 604, in a first data store, to produce a set of training data. A set of communication protocols associated with the set of training data is detected at 606, and the training data from the set of training data is restructured based on the set of communication protocols at 608, to produce processed data. A security policy is generated, at 610, based on the processed data (optionally in response to a user input). The first network traffic data is transmitted, at 612, in unmodified form, via an output port. Second network traffic data including multiple data packets is subsequently received, at 614, via the input port, and analyzed, at 616, based on the security policy (and, optionally, based on the non-malicious data) to determine a maliciousness of the second network traffic data. A signal can then be generated and transmitted, for example to trigger a remediation action based on the determined maliciousness of the second network traffic data. In some implementations, transmission of at least one data packet from the plurality of data packets of the second network traffic data is blocked in response to determining the maliciousness of the second network traffic data.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figures.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It is to be understood that the claims are not limited to the precise configuration, data structure, data formats, and/or components illustrated above. Various modifications, changes and variations may be made in the arrangement, operation and details of the systems, methods and apparatus described herein without departing from the scope of the claims.

The invention claimed is:

1. A method, comprising:
receiving first network traffic data including a plurality of data packets;
storing a representation of each data packet from the plurality of data packets in a first data store, to produce a set of training data;
detecting a plurality of communication protocols associated with the set of training data;
determining a set of rules based on the plurality of communication protocols, wherein the set of rules includes domain-specific information associated with each communication protocol detected;
restructuring training data from the set of training data according to the set of rules based on the detected plurality of communication protocols, to produce processed data;
storing the processed data, as non-malicious data, in a second data store;
transmitting, via an output port, the first network traffic data;
receiving second network traffic data including the plurality of data packets;
comparing the plurality of data packets of the second network traffic data to the non-malicious data to detect an anomaly in the second network traffic data; and
sending a signal to trigger a remediation action in response to detecting the anomaly in the second network traffic data.

2. The method of claim 1, wherein the remediation action includes blocking transmission of at least one data packet from the plurality of data packets of the second network traffic data.

3. The method of claim 1, wherein the plurality of communication protocols includes at least one of: Modbus, Financial Information eXchange (FIX), Distributed Network Protocol (DNP3), Ethernet Global Data (EGD), Ethernet/IP, Message Queuing Telemetry Transport (MQTT), Constrained Application protocol (COAP), IEC104, OPC Unified Architecture (UA) controls, Niagara Fox, Factory Interface Network Service (FINS), or Seamless Message Protocol (SLMP).

4. The method of claim 1, wherein the first network traffic data includes known non-malicious data.

5. The method of claim 1, wherein the producing the set of training data is performed during a time period associated with known non-malicious data transmission.

6. The method of claim 1, further comprising:
generating a security policy based on the processed data; and
applying the security policy to the second network traffic data.

7. A method, comprising:
receiving first network traffic data including a plurality of data packets;
storing a representation of each data packet from the plurality of data packets in a first data store, to produce a set of training data;
detecting a plurality of communication protocols associated with the set of training data;
determining a set of rules based on the plurality of communication protocols, wherein the set of rules includes domain-specific information associated with each communication protocol detected;
restructuring training data from the set of training data according to the set of rules based on the detected plurality of communication protocols, to produce processed data;
generating a security policy based on the processed data;
transmitting, via an output port, the first network traffic data;
receiving second network traffic data including the plurality of data packets;
analyzing the second network traffic data based on the security policy to determine a maliciousness of the second network traffic data; and
sending a signal to trigger a remediation action based on the determined maliciousness of the second network traffic data.

8. The method of claim 7, wherein the remediation action includes blocking transmission of at least one data packet from the plurality of data packets of the second network traffic data.

9. The method of claim 7, wherein the plurality of communication protocols includes at least one of: Modbus, Financial Information eXchange (FIX), Distributed Network Protocol (DNP3), Ethernet Global Data (EGD), Ethernet/IP, Message Queuing Telemetry Transport (MQTT), Constrained Application protocol (COAP), IEC104, OPC Unified Architecture (UA) controls, Niagara Fox, Factory Interface Network Service (FINS), or Seamless Message Protocol (SLMP).

10. The method of claim 7, wherein the restructuring the training data from the set of training data according to the set of rules includes compressing the training data from the set of training data according to the set of rules.

11. The method of claim 7, wherein the restructuring the training data from the set of training data according to the set of rules includes normalizing the training data from the set of training data according to the set of rules.

12. The method of claim 7, further comprising storing the processed data, as non-malicious data, in a second data store, wherein the analyzing the second network traffic data is further based on the non-malicious data.

13. The method of claim 7, further comprising receiving, via a user interface, a user input, the generating the security policy being in response to the user input.

14. An apparatus, comprising:
an input port;
an output port;
a processor; and
a memory operably coupled to the processor and storing instructions to cause the processor to:
receive, via the input port, network traffic data including a plurality of data packets;
store a representation of each data packet from the plurality of data packets in a data store, to produce a set of training data;
detect a plurality of communication protocols associated with the set of training data;
determine a set of rules based on the plurality of communication protocols, wherein the set of rules includes domain-specific information associated with each communication protocol detected;
restructure training data from the set of training data according to the set of rules based on the detected plurality of communication protocols, to produce processed data;
store the processed data as non-malicious data; and
transmit, via the output port, the network traffic data.

15. The apparatus of claim 14, wherein the memory further stores instructions to cause the processor to:
receive, via a user interface, a user input; and
store the representation of each data packet from the plurality of data packets during a training phase, the training phase initiated by the user input.

16. The apparatus of claim 14, wherein the memory further stores instructions to cause the processor to:
store the representation of each data packet from the plurality of data packets during a training phase that is automatically initiated according to a specified schedule.

17. The apparatus of claim 14, wherein the memory further stores instructions to cause the processor to:
generate a security policy based on the processed data.

18. The apparatus of claim 14, wherein the memory further stores instructions to cause the processor to:
receive live network traffic; and
perform anomaly detection based on the received network traffic and the processed data.

19. The apparatus of claim 14, wherein the plurality of communication protocols includes at least one of: Modbus, Financial Information eXchange (FIX), Distributed Network Protocol (DNP3), Ethernet Global Data (EGD), Ethernet/IP, Message Queuing Telemetry Transport (MQTT), Constrained Application protocol (COAP), IEC104, OPC Unified Architecture (UA) controls, Niagara Fox, Factory Interface Network Service (FINS), or Seamless Message Protocol (SLMP).

20. The apparatus of claim 14, wherein the memory further stores instructions to cause the processor to update a machine learning model based on the non-malicious data.

21. The apparatus of claim 14, wherein the network traffic data is a first network traffic data, the memory further storing instructions to:
receive second network traffic data including the plurality of data packets; and
compare the plurality of data packets of the second network traffic data to the non-malicious data to detect an anomaly in the second network traffic data.

* * * * *